Patented May 20, 1930

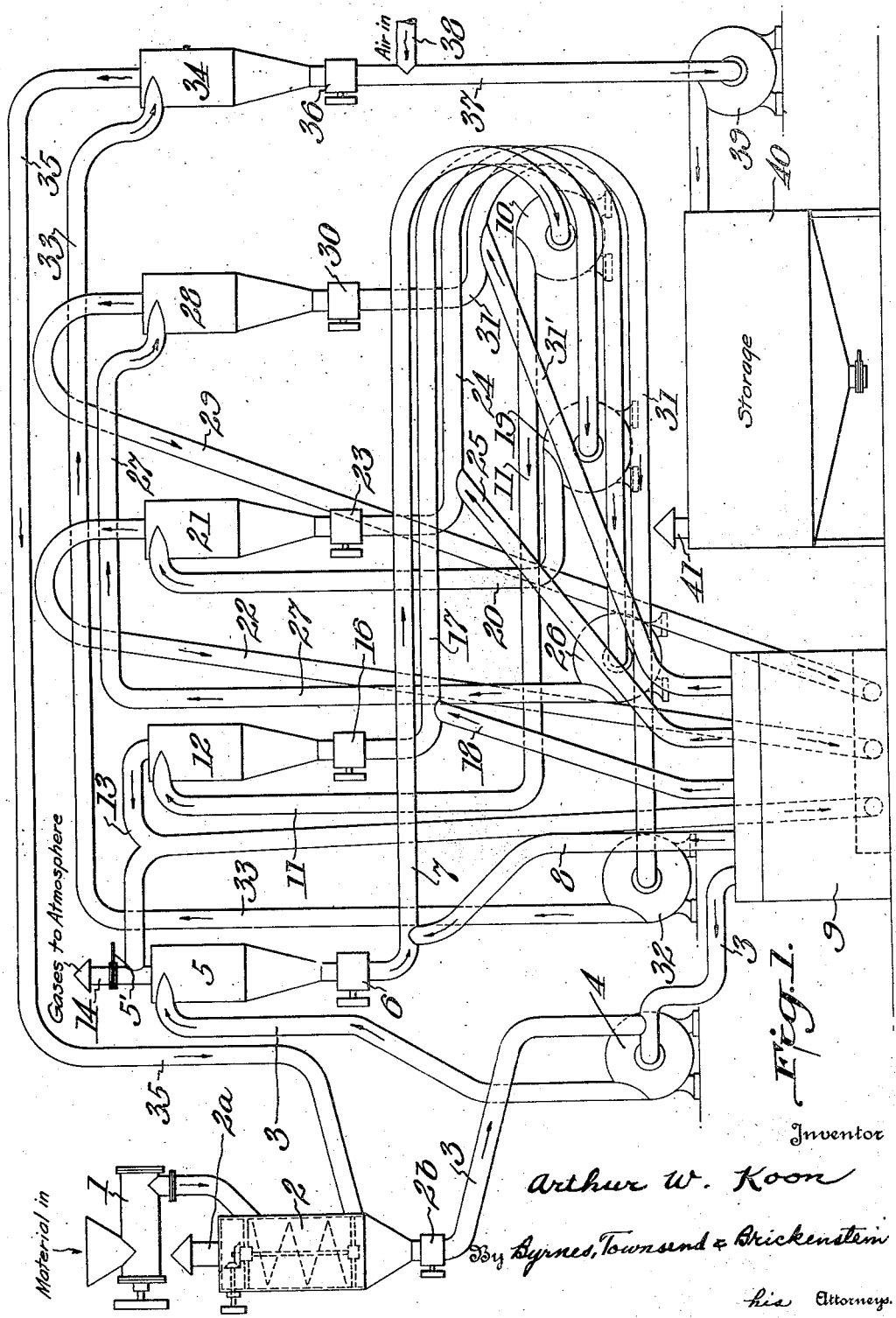

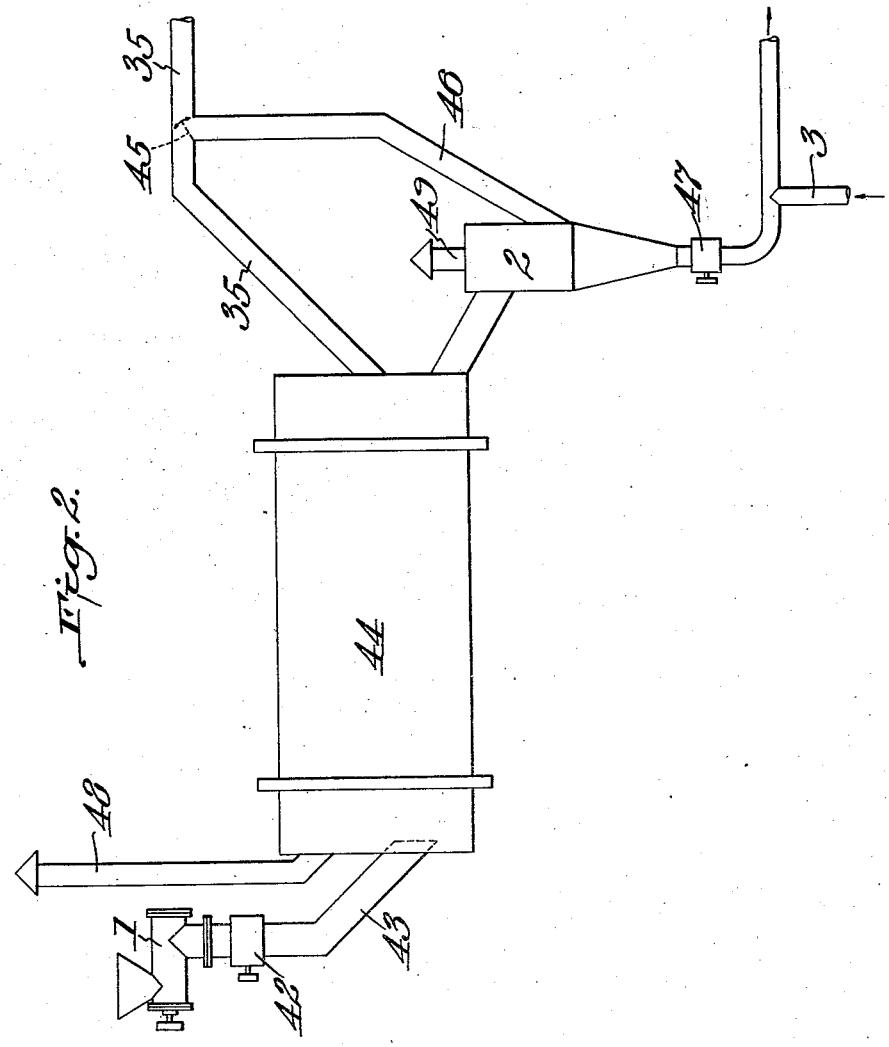

1,759,702

UNITED STATES PATENT OFFICE

ARTHUR W. KOON, OF THIBODAUX, LOUISIANA, ASSIGNOR TO ARTA MAY KOON, OF NEW ORLEANS, LOUISIANA

PROCESS, AND SYSTEM OF APPARATUS, FOR DESICCATING FOODSTUFFS

Application filed September 7, 1929. Serial No. 390,999.

This invention relates to processes of desiccating moist solids and semi-solids which are in such a divided condition that they may be carried in a travelling gaseous medium, and to a system of apparatus for carrying the same into effect. More particularly, it is concerned with a process and apparatus for treating,— e. g. "curing";—freshly-cut, immature, forage crops, and drying matured seed crops, other foodstuffs, and the like.

It is well known that the climatic conditions which best promote the growth of forage crops, grain crops and the like,—i. e. humid atmosphere, and frequent rains,—are those which interfere to the greatest extent with the natural curing of such products in preparation for storage for later use in the feeding of animals.

An object of the present invention, therefore, is to provide a commercially practicable process and apparatus for the artificial curing or drying of the aforementioned products.

My invention embraces a cyclical process involving, in each cycle, introducing the material to be desiccated,—in such a divided condition that it may be carried in a travelling gaseous medium,—into a current of a suitably proportioned mixture of steam and inert gaseous products of combustion at a temperature well above the dew-point of water, e. g. at a temperature of from about 300° to about 1200° F., maintaining free suspension of the material in said medium during the travel of the latter for a relatively brief period of time, during the course of which travel the material is mechanically treated, separating the material from the medium out of contact with atmospheric air and while the medium is still at a temperature materially above the dew-point of water, repeating the cycle with re-use of gaseous medium after re-conditioning the same, and finally suddenly cooling the material to a point below the ignition point of the same.

I have chosen as being a particularly desirable drying medium, a mixture of steam and inert gaseous products of combustion (i. e. gases incapable of supporting combustion of the material). In the course of a cycle the normal ratio between content of steam and content of the other gaseous components in the preferred medium becomes unbalanced by reason of the addition thereto of steam from the material undergoing desiccation, and the temperature of the medium drops considerably. Consequently, it is desirable, before re-use of the medium in another cycle, to heat the medium and to balance the ratio by an addition thereto of the other gaseous components of the medium. It is this addition of heat and hot gaseous products of combustion, or/and steam, to which I refer in the expression "re-conditioning".

The complete cyclical process of the present invention is carried out, down to but not including the final operation of chilling the desiccated material, under practically complete exclusion of atmospheric air. By this I mean that air is excluded in so far as possible in all stages of the process except the last.

The temperatures of the treatments must be determined by the character of the materials undergoing desiccation. Thus, in the drying of seed grains where the germinating properties of the seed are not to be interfered with, the gaseous drying medium is maintained at a relatively lower temperature,— but still materially above the dew-point of water,—of the order of say from 300° to 500° F. Where after-germination is not a consideration, the treatments may be effected at temperatures of the order of from 500° to 1000° F. or somewhat higher. In general, I prefer to so operate that in the first cycles the temperatures are materially higher than in the latter cycles.

The number of treatments resorted to in the cyclical process likewise is determined by the character,—e. g. moisture content and the like,—of the material to be desiccated. Thus, in a case where the material is only semi-solid and contains a relatively large amount of moisture,—such, for instance, as fish scrap, tankage, and the like,—as many as five or six cycles may be found to be necessary, whereas in the case of a solid material, such as a mature grain, the number of cycles may be reduced to as few as three or even two.

The invention embraces not only the process hereinbefore generally described but also a system of apparatus particularly adapted for carrying the process into effect. This system or "plant" is characterized as follows: For effecting a single treatment (i. e. cycle) in accordance with the hereinbefore-described process a unit of the system comprises in combination a circuitous conduit (preferably, suitably lagged to prevent undue loss of heat), means for causing a stream of the gaseous drying medium to circulate therein (e. g. the commonly known blower, or a circulation fan), means on the suction side of said circulation means for introducing divided material undergoing desiccation treatment into said conduit and said stream (which may be any suitable device for delivering divided solids without substantial inclusion of air, such as, for instance, a self-sealing dumping gate), means on the pressure side of said circulation means for separating from the said medium solid material carried thereby (such, for instance, as a centrifugal separator), and means,—between the said separating means and the said means for introducing material undergoing treatment,—for heating said gaseous drying medium and for adding thereto gaseous products of combustion.

It is a feature of the present invention that the last of the above-named means (i. e. the means for heating the gaseous medium and for adding thereto gaseous products of combustion) may be caused to be common to a plurality of the aforesaid units; that is to say, one such means may serve for the whole system. It (the said means) may well take the form of a furnace comprising an outer heating chamber, an inner chamber for the combustion of a fuel, said inner chamber communicating with said outer chamber near the top of the former, conduit openings near the base of said outer chamber for the introduction thereinto of depleted gaseous medium, and conduit openings near the top of said outer chamber and above said inner chamber for the drawing off of re-conditioned gaseous drying medium. The gases to be heated and conditioned pass into the heating chamber at a point or points near the bottom thereof, and circulate upwardly, serving to cool the refractory walls of the inner combustion chamber and as well cool the inside portions of the walls of the heating chamber. The walls of the latter chamber are, of course, suitably insulated to diminish heat losses.

A unit of apparatus, then, may comprise, in combination, a furnace, a blower or circulation fan for drawing gaseous drying medium therefrom, a conduit communicating therebetween and provided with a charging device for solids, a centrifugal collector, a conduit communicating between said blower and said collector, and a conduit communicating between said collector and said furnace, said charging device being a communication between the said conduit and a source of solid material undergoing desiccation treatment, such, for instance, as the centrifugal collector of the next preceding unit of apparatus. The length of conduit between charging device and centrifugal collector (which represents so much of the unit as provides for actual desiccation of the material) largely is determined by the capacity of the unit, and the desired speed of travel of the gaseous drying medium, and permits of several seconds' contact between medium and material.

Before the first of the drying units just described I may, and preferably do, position a pre-heating unit in which the fresh, divided, material is initially treated with partially exhausted gaseous drying medium from one of the later drying units of the system. In cases where the system is to operate upon materials which are not relatively heavily saturated with moisture and which are not of a gummy nature, the pre-heating unit may comprise a vertically disposed, conically-bottomed, cylindrical chamber provided with means for agitation. Material to be desiccated is delivered, in divided condition and without excess of air, into this chamber at a point near the top thereof, and gaseous drying medium from the finish drying unit collector is led thereinto at a point near the base of the chamber and is contacted with the divided material by the aid of the mechanical agitation. The resulting fully depleted gas is separated out, and the material, thus pre-heated, is delivered into the heating conduit of the first drying conduit by means of a charging device as described above. Or, in cases where the material to be desiccated is relatively heavily saturated and of a gummy nature, the pre-heating unit may take somewhat the form of a typical drying unit, differing therefrom in that (1) the conduit, within which the material is introduced into the current of gaseous drying medium, communicates between the suction side of a blower and the gas outlet port of the centrifugal collector of one of the later units of the system; and (2) the charging device for admission of material into this pre-heating unit is associated not with the material outlet of a centrifugal collector but with a device for dividing the material to be desiccated. The latter-named device may well take the form of a known ensilage cutter.

Following the last drying unit is a unit for the sudden cooling of the desiccated product. This comprises a conduit open at one end to the air and at the other end communicating with any suitable receiving receptacle or storage space, in which conduit are interposed a blower and, on the suction side of the blower and between the latter and the said open end of the conduit, a means for delivering thereinto desiccated divided material from the final centrifugal collector (e. g., the hereinbefore-described self-sealing dumping gate). The capacity of the blower is so adjusted with respect to the inflow of desiccated divided material,—that the material blowing into this final unit of the system is blasted with a relatively very large volume of atmospheric air, whereby suddenly to cool the material to below its kindling temperature.

The invention, in its double aspect of process and system of apparatus, will be more fully understood by recourse to the accompanying drawings, in which:

Fig. 1 is a diagrammatic representation of a system of apparatus illustrating a preferred embodiment of the process according to the present invention; and Fig. 2 is a diagrammatic representation of an optional form of pre-heating unit for use in the system of apparatus illustrated in Fig. 1.

According to Fig. 1—which illustrates a system comprising, in combination, one pre-heating unit, five heating units, and one unit for the final sudden cooling of desiccated material,—1 is a chopper or equivalent means which delivers divided material, without material inclusion of air, directly into the agitator-equipped preheating chamber 2. 2$^a$ is a discharge vent for depleted gases, and 2$^b$ is a charging device communicating between chamber 2 and conduit 3. 35 is a conduit communicating between the discharge port of centrifugal collector 34 and chamber 2.

Preheated material, which settles out of contact with gaseous medium and into the bottom of chamber 2, is delivered by means of charger 2$^b$ into conduit 3 where it is introduced into a stream of gaseous drying medium moving therein from furnace 9. In said stream the material is conducted into and through the blower 4 and thence into centrifugal collector 5. The here-separated medium passes in part to furnace 9 through conduit 13, and in part to atmosphere through outlet 14 by means of the pressure-control damper 5'. This represents the first of the five drying units.

Material separated in collector 5 is delivered by means of charger 6 into conduit 7 where it is introduced into a stream of medium carried thereto by conduit 8 from the furnace 9. In said stream the material is conducted into and through blower 10 and thence through conduit 11 into collector 12. The here-separated medium passes to furnace 9 through conduit 13. This represents the second of the five drying units.

The third drying unit comprises charger 16, conduits 17 and 18, blower 19, conduit 20, collector 21, and conduit 22. The fourth drying unit comprises charger 23, conduits 24 and 25, blower 26, conduit 27, collector 28, and conduit 29. The fifth drying unit comprises charger 30, conduits 31 and 31', blower 32, conduit 33, collector 34 and conduit 35.

As will be obvious to one skilled in the art, the elements of the preheating unit and of the several drying units,—including preheating chamber 2, the several centrifugal collectors, the conduits, and the like,—preferably are suitably lagged or insulated against heat losses.

In the aforesaid cooling unit, material is withdrawn from collector 34 by means of charger 36 and discharged into conduit 37. 38 represents an inlet for atmospheric air. The material so discharged is blasted with a large excess of air, passes into and through blower 39, and is discharged,—cooled,—into suitable storage or receiver 40. 41 represents a venting means for discharge of air from storage 40.

In Fig. 2 is illustrated an operable modified pre-heating unit. According to this modification, the divided material is delivered from chopper 1 through charger 42 and by means of conduit 43 into a drum preheater 44,— which is similar to the known inclined or horizontal cylindrical drier, with inner spiral flights, capable when in motion of delivering material from the intake to the discharge end thereof,—where it is intimately contacted with partially exhausted gaseous drying medium, in a stream delivered to the pre-heating unit from collector 34 through conduit 35. Thereafter, the material discharged from drum drier 44 is delivered to a preheating chamber 2 where it again is contacted with another portion of the said partially exhausted gaseous drying medium led from conduit 35, by means of an adjustable deflector 45, through conduit 46 into the lower portion of preheating chamber 2. 47 is a charger which serves to deliver preheated material from collector 2 into conduit 3 of the first unit stage of drying. 48 and 49 are venting means for discharging used gaseous medium from drum drier 44 and chamber 2, respectively.

The invention will be described with greater particularity in the following, it being understood that the scope of the invention is not restricted thereby.

*Artificial curing of a freshly-cut, immature forage crop such as oats "in the milk"*

The freshly-cut, immature, forage is divided into pieces of a suitable length, say, one fourth inch,—by passing the same longitudinally through a chopper of the ensilage cutter type, and the divided material continuously is introduced,—without inclusion of a substantial amount of air,—into and contacted with a body of partially exhausted gaseous drying medium, comprising steam and inert gaseous products of combustion, at a temperature of about 700° F., maintained in a pre-heating chamber. The divided material is suspended in the body of the medium, partly by the aid of mechanical agitation, for a prolonged time. The pre-heated, divided, material gradually is precipitated by gravity from the gaseous medium, which latter is vented to the atmosphere.

The pre-heated divided material continuously is withdrawn from the bottom of said chamber by means of a charger, introduced into a stream of the gaseous drying medium at a temperature of about 1000° F. issuing from the furnace, and carried therein into and through a blower and through the drying pass, and into a centrifugal collector. During this contact between gaseous drying medium and material the latter yields to the former a considerable amount of water, in the form of steam. At least a part of the gaseous medium is returned to the furnace for re-conditioning (i. e., for addition thereto of heat and of gaseous products of combustion) and a part may be vented to the atmosphere through a suitable pressure-control damper.

The material, withdrawn from the bottom of the centrifugal collector by means of a charger, thereafter is subjected to a third and a fourth drying treatment substantially equivalent to that just described; that is to say, in each cycle of treatment a stream of the material is introduced continuously into a stream of gaseous drying medium (issuing from the furnace) at a temperature of about 1000° F.; is carried in said stream into and through a blower and thereafter into a centrifugal collector where separation of material from medium is effected. The medium is thence returned to the furnace for re-conditioning.

The fifth or final drying treatment to which the material is subjected is equivalent to the four preceding treatments, the cycle of operations in this latter treatment differing from the preceding ones in that, after the separation of the fully desiccated material from the medium in a centrifugal collector, the separated medium (which in this final stage of the process is not substantially "unbalanced" in ratio between content of steam and content of gaseous products of combustion because of the fact that in said final drying treatment there remained but little moisture in the material to be extracted) is not returned to the furnace for re-conditioning but rather is diverted to a pre-heating treatment of fresh material.

An essential element of the process is the step of suddenly reducing the temperature of the fully desiccated and very hot material to below the ignition point thereof. This is effected by continuously withdrawing the material, from the centrifugal collector of the final drying cycle, by means of a charger and continuously introducing the same, in a stream, into a relatively more rapid current of atmospheric air of relatively great volume, carrying the material in said current of air into and through a blower (which phase of the treatment appears to aid in the operation by accelerating the transfer of heat from material to air) and thence to a point of reception, such as, for instance, a suitable storage space. Insulation of the conduits or piping intentionally is avoided in this operation, and the conduits are fabricated from lighter sheet metal—in order to aid in the rapid transfer of heat away from the material.

This final operation of sudden cooling is absolutely necessary, in that in substantially each instance where it has been attempted,—experimentally,—to avoid the cooling step and discharge the material directly from the collector of the final drying cycle, the material has suffered spontaneous combustion. If heat were left in the finally desiccated material the latter would suffer from progressive cooking, with attendant discoloration, and thus would lose some of the advantages of this process of instantaneous drying at high temperatures.

When the drying of fodder crops has been carried out in accordance with the process herein described and claimed, the resultant product has a rich green color, is sweet, and is well received by the fodder-eating animals.

As being indicatory of the total time required for the complete operation of the process, it is noted that the curing of immature forage,—as specifically described above,—requires from 30 to about 45 seconds. That is to say, 30 to 45 seconds after chopped forage begins to be introduced into the pre-heating cycle, fully desiccated material begins to be discharged at storage.

As will be obvious from the foregoing, the number of necessary drying cycles in the carrying out of the process is determined by the character of the material to be desiccated. Thus in operating upon a material of relatively low moisture content, such as, for instance, fully matured grain, less moisture is present to be extracted, and the number of necessary drying cycles is correspondingly diminished.

I have found that matured crops may not only be dried satisfactorily in accordance with this process, but also threshed, hulled and/or "milled" (i. e. the outer layers of the grains removed). These well-known mechanical treatments of material grain-containing products all are effectable in accordance with the foregoing process.

I have given theoretical consideration to the process of the present invention, and believe that the exceptional success of the same may be explained in part by the following:

The high temperature of the inert gases which first are brought into intimate contact relation with the divided material greatly expands the outer layers of water cells or bladders of the vegetable structure: The mechanical action of the blower blades tends to rupture these expanded bladders, releasing the contained water in the form of steam. Inner layers of water bladders then are reached by the highly heated inert gases, are expanded and then ruptured by the succeeding fan blades. By virtue of the several repetitions of the drying treatment, the substantially whole moisture content of the vegetable structure is released and separated, and a fully-desiccated product is obtained. The particular medium employed also explains the efficiency. The major portion of the medium is steam, which ordinarily is supplied by the material treated. Steam from an outside source may of course be employed, and is employed at the starting of the process. I find that combustion gases alone provide a disadvantageous medium, in that they parch the material and frequently do not desiccate it fully. Aside from theoretical explanations, it is established that the fibrous product obtained by the carrying out of my process is fully desiccated, instead of having merely the outer coverings of each structure dehydrated. A new result is attained, in that the fully desiccated forage "keeps" indefinitely, and may be exposed for a protracted period to humid atmosphere without liability of spoilage.

The invention embraces not only the above-described concrete embodiments but as well modification thereof which naturally will suggest themselves to one skilled in the art to which it appertains.

What I claim is:

1. A process for desiccating fodder, forage and like foodstuff materials which comprises introducing the material to be desiccated into a current of a gaseous drying medium consisting of a suitably proportioned mixture of steam and inert gaseous products of combustion at a temperature materially above the dew-point of water, maintaining free suspension of the material in said medium during the travel of the latter for a relatively brief period of time during the course of which travel the material is mechanically treated, and separating the material from the medium out of contact with air and while the medium is still at a temperature materially above the dew-point of water.

2. A process for desiccating fodder, forage and like foodstuff materials which comprises introducing the material to be desiccated into a current of a gaseous drying medium consisting of a suitably proportioned mixture of steam and inert gaseous products of combustion at a temperature materially above the dew-point of water, maintaining free suspension of the material in said medium during the travel of the latter for a relatively brief period of time during the course of which travel the material is mechanically treated, separating the material from the medium out of contact with air and while the medium is still at a temperature materially above the dew-point of water, and suddenly cooling the material to a point below the ignition point of the material.

3. A cyclical process for desiccating fodder, forage and like foodstuffs materials, involving, in each cycle, introducing the materials, involving, in each cycle, introducing the material to be desiccated, in a divided condition, into a current of inert gaseous drying medium at a temperature materially above the dew-point of water, maintaining free suspension of the material in said medium during the travel of the latter for a relatively brief period of time during the course of which travel the material is mechanically treated, separating the material from the medium out of contact with air, repeating the cycle with re-use of the gaseous medium after re-conditioning of the same, and finally suddenly cooling the material to a point below the ignition point of the material.

4. A cyclical process for desiccating fodder, forage and like foodstuff materials, involving, in each cycle, introducing the material to be desiccated, in a divided condition, into a current of a gaseous drying medium consisting of a suitably proportioned mixture of steam and inert gaseous products of combustion at a temperature of from about 300° to about 1200° F., maintaining free suspension of the material in said medium during the travel of the latter for a relatively brief period of time during the course of which travel the material is mechanically treated, separating the material from the medium out of contact with air and while the medium is still at a temperature materially above the dew-point of water, repeating the cycle with re-use of the gaseous medium after re-conditioning of the same, and finally suddenly cooling the material to a point below the ignition point of the material.

5. A cyclical process for desiccating fodder, forage and like foodstuff materials, comprising dividing the material, introducing the divided material into a suspending current of partially spent inert gaseous drying medium from a final desiccation treatment of a previous quantity of material at a temperature materially above the dew-point of water, maintaining free suspension of the material in the partially spent medium during the travel of the latter for a relatively brief period of time during the course of which travel the material is mechanically treated, separating the material from the partially spent medium out of contact with air while the medium is still at a temperature materially above the dew-point of water and exhausting the resulting spent medium to the atmosphere subjecting the separated material to a plurality of drying treatments involving, in each cycle, introducing the material into a suspending current of gaseous drying medium consisting of steam and inert gaseous products of combustion at a temperature of the order of 1000° F., maintaining free suspension of the material in the medium during the travel of the latter for a relatively brief period of time during the course of which travel the material is mechanically treated, separating the material from the medium out of contact with air, and reconditioning the separated medium for re-use, and finally suddenly cooling the material to a point below the ignition point of the material by blasting with air.

6. A system of apparatus for carrying out the process defined in claim 3, comprising, in combination a plurality of units, each of which consists of a circuitous conduit, means interposed in said conduit for causing a stream of gaseous drying medium to circulate therein, means on the suction side of said circulation means for introducing divided material undergoing desiccation treatment into said conduit and said stream, means on the pressure side of said circulation means for separating from the said medium material carried thereby, and means between the said separating means and the said introduction means for heating at least a portion of the gaseous drying medium and for adding thereto inert gaseous products of combustion, and a discharge conduit open at both inlet and outlet and communicating with the separation means of one of said units, in which discharge conduit there is interposed, between the said separation means and the outlet, means for the circulation therethrough of air.

In testimony whereof, I affix my signature.

ARTHUR W. KOON.